United States Patent
Sederquist

(10) Patent No.: US 6,207,306 B1
(45) Date of Patent: Mar. 27, 2001

(54) APPARATUS FOR HUMIDIFYING THE AIR STREAM OF A FUEL CELL POWER PLANT

(75) Inventor: Richard A. Sederquist, Newington, CT (US)

(73) Assignee: International Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/217,256

(22) Filed: Dec. 21, 1998

(51) Int. Cl.$^7$ .............................. H01M 8/04; H01M 8/00

(52) U.S. Cl. .................. 429/17; 429/12; 429/13; 429/14; 429/16; 429/19; 429/26; 429/34; 429/38; 429/39

(58) Field of Search ................. 429/12, 13, 14, 429/17, 34, 38, 39, 16, 19, 26, 20

(56) References Cited

U.S. PATENT DOCUMENTS

| | | | |
|---|---|---|---|
| 4,530,886 | * | 7/1985 | Sederquist ............... 429/13 |
| 4,539,267 | * | 9/1985 | Sederquist ............... 429/17 |
| 4,693,945 | * | 9/1987 | Ohyauchi et al. ......... 429/21 |
| 5,064,463 | | 11/1991 | Ciomek ................... 75/314 |
| 5,441,695 | | 8/1995 | Gladden .................. 419/37 |

OTHER PUBLICATIONS

U.S. Ser. No. 09/216,364 filed Dec. 18, 1998.
U.S. Ser. No. 09/216,365 filed Dec. 18, 1998.

* cited by examiner

Primary Examiner—Stephen Kalafut
Assistant Examiner—Angela J. Martin
(74) Attorney, Agent, or Firm—McCormick, Paulding & Huber LLP

(57) ABSTRACT

A water recovery fuel cell system includes a fuel cell defining a cathode flow field including a cathode input port and a cathode output port, and an anode flow field including an anode input port and an anode output port A humidity exchange device defines a supply gas input port, a supply gas output port, a process exhaust gas input port and a process exhaust gas output port. The supply gas input port is to be coupled to a source of oxidant gas, and the supply gas output port is coupled to the fuel cell power plant oxidant air supply including the cathode input port of the fuel cell. The process exhaust gas output port communicates at a junction with the cathode output port and a combustor exhaust derived from the anode flow field of the fuel cell, and the exhaust gas output port communicates with a power plant exhaust conduit. A power plant exhaust path is defined from the cathode output port to the power plant exhaust conduit via the humidity exchange device. A water recovery condenser is disposed along the power plant exhaust path between the junction and the power plant exhaust conduit.

22 Claims, 5 Drawing Sheets

APPARATUS FOR HUMIDIFYING THE AIR STREAM OF A FUEL CELL POWER PLANT

FIELD OF THE INVENTION

The present invention relates generally to fuel cell systems, and more particularly to PEM and PAFC fuel cell systems incorporating water management for water self-sufficiency and humidification of the oxidant air stream.

BACKGROUND OF THE INVENTION

Fuel cell power plants are well-known and are commonly used to produce electrical energy from reducing and oxidizing fluids to power electrical apparatus. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In cells utilizing a proton exchange membrane or an acid as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is a proton exchange membrane ("PEM") electrolyte, which consists of a solid polymer well-known in the art. Other common electrolytes used in fuel cells include aqueous solutions of phosphoric acid (PAFC) or potassium hydroxide (AFC) held within a porous, non-conductive matrix between the anode and cathode electrodes. It has been found that PEM cells have substantial advantages over cells with liquid acid or alkaline electrolytes in satisfying specific operating parameters because the low temperature performance of PEM fuel cells is superior to other fuel cells, and because the membrane of the PEM provides a barrier between the reducing fluid and oxidant that is more tolerant to pressure differentials than a liquid electrolyte held by capillary forces within a porous matrix. PEM fuel cells are also superior because the PEM environment is less corrosive than the aqueous electrolytes. Additionally, the PEM electrolyte is fixed, and cannot be leached from the cell, and the membrane has a relatively stable capacity for water retention. As is well-known however, PEM cells have significant limitations especially related to liquid water transport to, through and away from the PEM, and related to simultaneous transport of gaseous reducing and oxidant fluids to and from the electrodes adjacent opposed surfaces of the PEM. The prior art includes many efforts to minimize the effect of those limitations.

In operation of a fuel cell employing a PEM, the membrane is saturated with water, and the anode electrode adjacent to the membrane must remain wet. As hydrogen ions produced at the anode electrode transfer through the electrolyte, they drag water molecules in the form of hydronium ions with them from the anode to the cathode. Water also transfers back to the anode from the cathode by osmosis. Product water formed at the cathode electrode is removed by evaporation or entrainment into a circulating gaseous stream of oxidant, or by capillary action into and through a porous fluid transport layer adjacent to the cathode. Porous fluid transport plates may be used to supply water from a supply of coolant water to the anode electrode and remove water from the cathode electrode returning it back to the coolant water supply, and the plates thereby also serve to remove heat from the electrolyte and electrodes.

In operation of PEM fuel cells, it is critical that a proper water balance be maintained between a rate at which water is produced at the cathode electrode and rates at which water is removed from the cathode and at which water is supplied to the anode electrode. An operational limit on performance of a fuel cell is defined by an ability of the cell to maintain the water balance as electrical current drawn from the cell into the external load circuit varies and as an operating environment such as the surrounding temperature of the cell varies. For PEM fuel cells, if insufficient water is returned to the anode electrode, adjacent portions of the PEM electrolyte dry out thereby decreasing the rate at which hydrogen ions may be transferred through the PEM and also resulting in cross-over of the reducing fluid, which is typically hydrogen or a hydrogen rich gas, leading to local over heating. Similarly, if insufficient water is removed from the cathode, the cathode electrode may become flooded effectively limiting oxidant supply to the cathode and hence decreasing current flow. Additionally, if too much water is removed from the cathode by the gaseous stream of oxidant, the cathode may dry out so as to limit the ability of hydrogen ions to pass through the PEM, thus decreasing cell performance.

As fuel cells have been integrated into power plants developed to power transportation vehicles such as automobiles, trucks and buses, maintaining an efficient water balance within the power plant has become a greater challenge because of a variety of factors. For example, with a stationary fuel cell power plant, water lost from the plant may be replaced by water supplied to the plant from off-plant sources. With a transportation vehicle, however, to minimize weight and space requirements of a fuel cell power plant, the plant must be self-sufficient in water to be viable. Normally, the power plant exhaust passes through a condenser to remove excess water as condensed water. This water is recycled, converted into steam and fed to the fuel processing system to support the steam reforming and water gas shift hydrogen generation reactions in the fuel processor. When the amount of product water in the power plant exhaust leaving the power plant interface is equal to the amount of water that would be created by burning the reactant fuel, then the power plant is said to be operating at just the point of water self sufficiency. Neither is excess water being stored in the power plant, nor is make up water from another source required to support the fuel processor needs.

Furthermore, a fuel cell power plant may contain a well known fuel processing system for converting an organic fuel, such as methane or gasoline, into a hydrogen rich fuel for use within the fuel cell. Such a power plant requires water as a reactant along with the hydrocarbon fuel in the fuel processing system. Water self sufficiency for a fuel cell power plant containing a fuel processing system is defined as that point where the water recovered from the cell either internally through a water transport plate within the cell or externally by a water recovery condenser, or other water recovery means, is equal to the quantity of water required for the fuel processing reactions.

Although a PEM fuel cell was used in the explanation given above, the same requirements for water self sufficiency exists for any type of fuel cell that consumes an organic fuel and that contains a fuel processor such as a fuel cell power plant which incorporates a phosphoric acid fuel cell.

Accordingly, it is an object of the present invention to provide a fuel cell system which exchanges water between the power plant exhaust and inlet air streams to maintain the high levels of air humidification required for the fuel cell cathode for peak operating efficiency.

It is another object of the present invention to provide a fuel cell system which enhances the operation of the water recovery condenser to increase water recovery and maintain water self-sufficiency in arid operating environments.

The above and other objects and advantages of this invention will become more readily apparent when the following description is read in conjunction with the accompanying drawings.

SUMMARY OF THE INVENTION

According to a first aspect of the present invention, a water recovery fuel cell system includes a fuel cell defining a cathode flow field including a cathode input port and a cathode output port, and an anode flow field including an anode input port and an anode output port. An anode exhaust combustor means has an input port communicating with the anode output port and has an output communicating at a junction with the cathode output port for providing a combustor exhaust combined at the junction with cathode exhaust leaving the cathode output port to form a process exhaust gas. A humidity exchange device defines a supply gas input port, a supply gas output port, a process exhaust gas input port and a process exhaust gas output port. The supply gas input port is to be coupled to a source of oxidant gas which typically feeds the fuel cell system oxidant gas to the fuel cell cathode flow field and to the anode exhaust combustor means. The supply gas output port is coupled to the cathode input port of the fuel cell and to the input port of the anode exhaust combustor means. The process exhaust gas input port communicates with the junction, and the exhaust gas output port communicates with a power plant exhaust conduit. A power plant exhaust path is defined from the cathode output port of the fuel cell to the power plant exhaust conduit via the humidity exchange device. A water recovery condenser is disposed along the power plant exhaust path between the junction and the power plant exhaust conduit.

According to a second aspect of the present invention, a water recovery fuel cell system includes a fuel cell defining a cathode flow field including a cathode input port and a cathode output port, and an anode flow field including an anode input port and an anode output port. An anode exhaust combustor means has an input port communicating with the anode output port and has an output communicating at a junction with the cathode output port for providing a combustor exhaust combined at the junction with cathode exhaust leaving the cathode output port to form a process exhaust gas. A contact condenser defines a water input port, a water output port, a gas input port and a gas output port. The gas input port of the contact condenser communicates with the junction, and the gas output port of the contact condenser communicates with a power plant exhaust conduit to thereby form an exhaust path from the cathode output port to the power plant exhaust conduit via the contact condenser. A contact saturator defines a water input port, a water output port, a gas input port and gas output port. The gas input port of the contact saturator receives an oxidant gas flow. The gas output port of the contact saturator is coupled to the cathode input port of the fuel cell and to the input port of the anode exhaust combustor means. The water output port of the contact condenser is coupled to the water input port of the contact saturator, and the water output port of the contact saturator is coupled to the water input port of the contact condenser to thereby form a closedloop for circulating water through the contact condenser and the contact saturator. Means for circulating water through the contact condenser and the contact saturator is provided. A water recovery condenser is disposed along the power plant exhaust path between the junction and the power plant exhaust conduit.

According to a third aspect of the present invention, a water recovery fuel cell system includes a fuel cell defining a cathode flow field including a cathode input port and a cathode output port, and an anode flow field including an anode input port and an anode output port An anode exhaust combustor means has an input port communicating with the anode output port and has an output communicating with the cathode output port at a junction for providing a combustor exhaust combined at the junction with cathode exhaust leaving the cathode output port to form a process exhaust gas. A water recovery condenser includes a gas input port and a gas output port. The gas output port is coupled to a power plant exhaust conduit. A contact condenser defines a water input port, a water output port, a gas input port and a gas output port. The gas input port of the contact condenser is coupled to the junction, and the gas output port of the contact condenser is coupled to the gas input port of the water recovery condenser. A contact saturator defines a water input port, a water output port, a gas input port and gas output port. The gas input port of the contact saturator is for receiving an oxidant gas flow. The gas output port of the contact saturator is coupled to the cathode input port of the fuel cell and to the input port of the anode exhaust combustor means. The water output port of the contact condenser is coupled to the water input port of the contact saturator, and the water output port of the contact saturator is coupled to the water input port of the contact condenser to thereby form a closed-loop for circulating water through the contact condenser and the contact saturator. Means for circulating water through the contact condenser and the contact saturator is provided.

According to a fourth aspect of the present invention, a water recovery fuel cell system includes a fuel cell defining a cathode flow field including a cathode input port and a cathode output port, and an anode flow field including an anode input port and an anode output port. An anode exhaust combustor means has an input port communicating with the anode output port and has an output communicating with the cathode output port at a junction for providing a combustor exhaust combined at the junction with cathode exhaust leaving the cathode output port to form a process exhaust gas. A water recovery condenser includes a gas input port and a gas output port. The gas input port is coupled to the junction. A contact condenser defines a water input port, a water output port, a gas input port and a gas output port. The gas input port of the contact condenser is coupled to the gas output port of the water recovery condenser, and the gas output port of the contact condenser communicates with a power plant exhaust conduit. A contact saturator defines a water input port, a water output port, a gas input port and gas output port. The gas input port of the contact saturator is for receiving an oxidant gas flow. The gas output port of the contact saturator is coupled to the cathode input port of the fuel cell and to the input port of the anode exhaust combustor means. The water output port of the contact condenser is coupled to the water input port of the contact saturator, and the water output port of the contact saturator is coupled to the water input port of the contact condenser to thereby form a closed-loop for circulating water through the contact condenser and the contact saturator. Means for circulating water through the contact condenser and the contact saturator is provided.

DETAILED DESCRIPTION OF THE PREFERRED EMBODIMENTS

Figure 1:
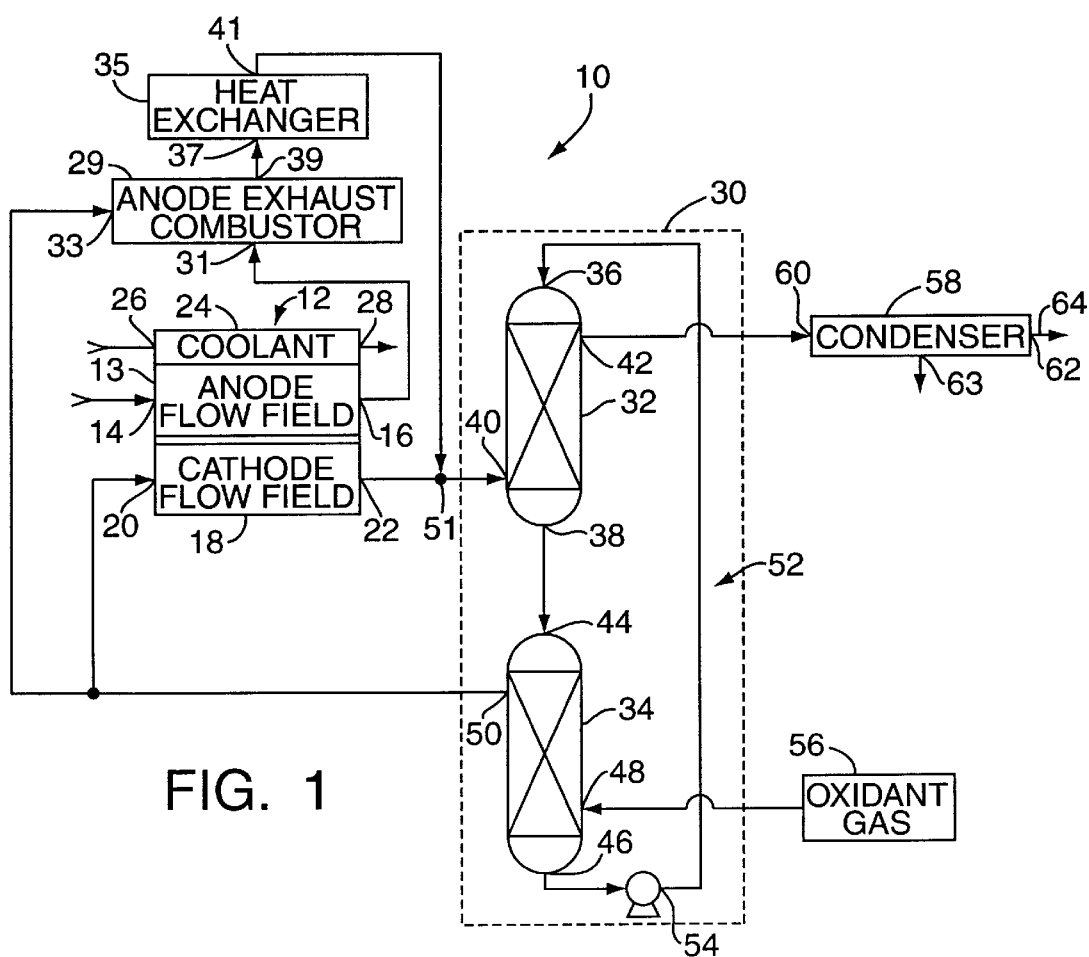
FIG. 1 schematically illustrates a water recovery fuel cell system including a humidity exchange device disposed upstream from a water recovery condenser in accordance with a first embodiment of the present invention.

With reference to FIG. 1, a water recovery fuel cell system in accordance with a first embodiment of the present invention is generally designated by the reference number 10. The system 10 includes a fuel cell stack 12 defining an anode flow field 13 extending between an anode input port 14 and an anode output port 16, a cathode flow field 18 extending between a cathode input port 20 and a cathode output port 22, and a coolant flow field 24 extending between a coolant input port 26 and a coolant output port 28. The fuel cell stack 12 generally includes a plurality of fuel cells connected in series electrically through a load, but is herein depicted as a single cell for purposes of clarity. An anode exhaust combustor 29 has an input port 31 coupled to the anode output port 16 and a gas input port 33 coupled to an oxidant gas source 56. A heat exchanger 35 has an input port 37 coupled to an output port 39 of the anode exhaust combustor, and an output or combustor exhaust port 41. The anode exhaust combustor 29 and the heat exchanger 35 cooperate to provide a combustor exhaust having moisture to be extracted along with a cathode exhaust leaving the cathode output port 22.

The fuel cell system 10 further includes a humidity exchange device enclosed by dashed lines and generally designated by the reference number 30 for transferring water vapor from an oxidant exhaust gas stream leaving the cathode output port 22 of the fuel cell 12 and the anode exhaust combustor exhaust leaving the anode exhaust combustor exhaust port 41 to an oxidant supply gas stream entering the cathode input port 20 of the fuel cell and the anode exhaust combustor 29 at input port 33 so as to humidify the oxidant supply gas stream. Preferably, as shown in FIG. 1, the humidity exchange device 30 includes a contact condenser 32 and a contact saturator 34 which both operate by having direct contact between a flowing liquid, such as water, and an oxidant gas stream to be either humidified (in the contact saturator 34) or from which water is to be condensed (in the contact condenser 32). The contact condenser 32 and the contact saturator 34 are filled with a high surface area inert material such as plastic, ceramic, or metallic saddles, rings, or other suitable packing material or trays, over and through which the liquid and the oxidant gas stream pass simultaneously in direct contact therewith. Preferably, the liquid or water passes downwardly by gravity while the oxidant gas stream travels countercurrent thereto. Alternatively, the contact condenser 32 and the contact saturator 34 may comprise any other suitable means for transferring water vapor from the oxidant gas exhaust leaving the cathode output port 22 of the fuel cell 12 and the combustor exhaust leaving the combustor exhaust port 39 to the oxidant gas stream entering the cathode input port 20 and to the input port 33 of the anode exhaust combustor 29 in order to humidify the oxidant gas stream.

As shown in FIG. 1, the contact condenser 32 includes a water input port 36, a water output port 38, a gas input port 40 and a gas output port 42. Similarly, the contact saturator 34 includes a water input port 44, a water output port 46, a gas input port 48 and a gas output port 50. The gas input port 40 of the contact condenser 32 is coupled to the cathode output port 22 and the anode exhaust combustor exhaust port 41 via a junction 51. The water output port 38 of the contact condenser 32 is coupled to the water input port 44 of the contact saturator 34, and the water output port 46 of the contact saturator is coupled to the water input port 36 of the contact condenser to thereby form a water loop 52. The water loop 52 is a closed-loop path along which water circulates through the contact condenser 32, through the contact saturator 34, and back to the contact condenser. A means for circulating water about the water loop 52, such as a water pump 54, is disposed along the water loop between the water output port 46 of the contact saturator 34 and the water input port 36 of the contact condenser 32, but may be disposed at any other suitable location along the water loop for circulating water therealong.

The oxidant gas source 56, such as an air pump or pressurized oxygen tank, is coupled to the gas input port 48 of the contact saturator 34, and the gas output port 50 of the contact saturator is coupled to the cathode input port 20 of the fuel cell 12 and to the input port 33 of the anode exhaust combustor 29 in order to humidify via the contact saturator the oxidant gas supplied to the fuel cell and to the anode exhaust combustor.

A water recovery condenser 58 including a gas input port 60, a gas output port 62 and a water output port 63 for directing a condensed water stream to a fuel processing system (not shown) is coupled downstream of the humidity exchange device 30 relative to the direction of the oxidant exhaust gas flow. More specifically, the gas input port 60 of the water recovery condenser 58 is coupled to the gas output port 42 of the contact condenser 32, and the gas output port 62 of the water recovery condenser is coupled to a gas exhaust conduit 64.

In operation, a reactant or reducing fluid is supplied to the anode flow field 13 of the fuel cell 12, and an oxidant gas stream, such as oxygen or air, is supplied to the cathode flow field 18 of the fuel cell and to the anode exhaust combustor 29 via the humidity exchange device 30. Hydrogen electrochemically reacts at a surface of an anode electrode to produce hydrogen ions and electrons. The excess fuel or reducing fluid exhaust gas stream leaves the fuel cell 12 via the anode output port 16 where it is directed to the anode exhaust combustor 29. The excess fuel reacts with an oxidant such as air producing water in the exhaust combustor 29 and is cooled in the heat exchanger 35 before mixing with the oxidant exhaust gas stream to form a process exhaust stream. The electrons are conducted to an external load circuit (not shown) and then returned to a cathode electrode, while hydrogen ions transfer through an electrolyte to the cathode electrode where they react with the oxidant and electrons to produce water and release thermal energy. The humidified cathode or oxidant exhaust gas stream leaves the fuel cell 12 at the cathode output port 22, mixes with the anode exhaust combustor exhaust leaving the combustor exhaust port 41 of the heat exchanger 35 to form a process exhaust, and then enters the gas input port 40 of the contact condenser 32 where water is condensed out of the combined cathode or oxidant exhaust and combustor exhaust gas streams and thereafter is circulated by the water pump 54 about the dosed water loop 52.

As the water is circulating about the water loop 52, the oxidant gas supplied from the oxidant source 56 and on route to the fuel cell 12 enters the contact saturator 34 at the gas input port 48, flows through the contact saturator, and leaves the contact saturator at the gas output port 50. As the oxidant gas travels through the contact saturator 34, water flowing along the closed loop 52 through the contact saturator and thermal energy carried by the water respectively evaporates water which is absorbed in the oxidant gas stream so as to humidify the oxidant gas stream prior to entering the fuel cell 12 and the anode exhaust combustor 29 via the cathode input port 20 and the input port 33 of the anode exhaust combustor 29, respectively. More specifically, water at a temperature below its boiling point but higher than the required gas saturation temperature at the gas output port 50 of the contact saturator 34 passes downward through the contact saturator 34 in direct contact with the oxidant gas. Some of the water evaporates within the contact saturator 34 and the water stream is concurrently reduced in temperature. The gas stream flowing through the contact saturator 34 increases in saturation temperature as it continues to pick up evaporated water along with its thermal energy and approaches, in the limit, a saturation temperature equal to the temperature of the hot water entering the contact saturator. The size and efficiency of the contact saturator 34 will determine how dose the oxidant gas stream will approach this saturation temperature.

Meanwhile water passing through the contact condenser 32 passes through the high surface area material of the contact condenser in direct contact with relatively hotter process gas passing therethrough. The temperature of the water entering the contact condenser 32 should be lower than the required saturation temperature of the process exhaust gas leaving the contact condenser at the gas output port 42. The saturation temperature approaches, in the limit, the water temperature at the water input port 36 of the contact condenser 32. The size and efficiency of the contact condenser 32 will determine how close the process exhaust gas stream approaches this saturation temperature. With the appropriate oxidant composition and flow rate, and with a reasonable approach to the limiting saturation temperatures in both the contact condenser 32 and the contact saturator 34, the process can be made close to or completely self-sustaining requiring neither external cooling nor heating. In other cases, the amount of external heat required to help sustain the humidification process can be minimized or substantially reduced.

An advantage of the present invention is that the temperature at which water condenses in the contact condenser 32 is higher than the temperature at which water is evaporated in the contact saturator 34. This means that the heat of condensation absorbed by the water as it passes through the contact condenser 32 can be used to provide the heat of vaporization in the contact saturator 34. The use of the heat of condensation to provide the heat of evaporation allows the use of the heat produced in the fuel cell 12 to be used for purposes other than raising steam for humidification.

The principal driving force for either humidifying the oxidant supply gas stream in the contact saturator 34 or condensing water from the process exhaust gas stream in the contact condenser 32 is due to the local absorption value difference between the water temperature and the gas saturation temperature. The rate of the circulating water flow required depends on the amount of water to be transferred between the contact condenser 32 and the contact saturator 34, and the desired temperature change which the circulating water will experience in the contact condenser and the contact saturator. The sensible heat picked-up in the contact condenser 32 or given up in the contact saturator 34 by the recirculating water stream is generally equal to the energy requirements of the contact condenser and the contact saturator to condense or evaporate the water transferred in the process.

The location of the humidity exchange device 30 upstream of the water recovery condenser 58 increases the driving force between condensing and evaporating sides of the water recovery condenser to thereby increase performance of the humidity exchange device.

The fuel cell system 10 functions well in an ambient pressure fuel cell power plant. The humidity exchange device 30 such as the contact condenser 32/contact saturator 34, or a rotary regenerator disposed upstream of the water recovery condenser 58 can achieve the high levels of oxidant gas or air humidification required for the efficient operation of the fuel cell 12.

Figure 2:
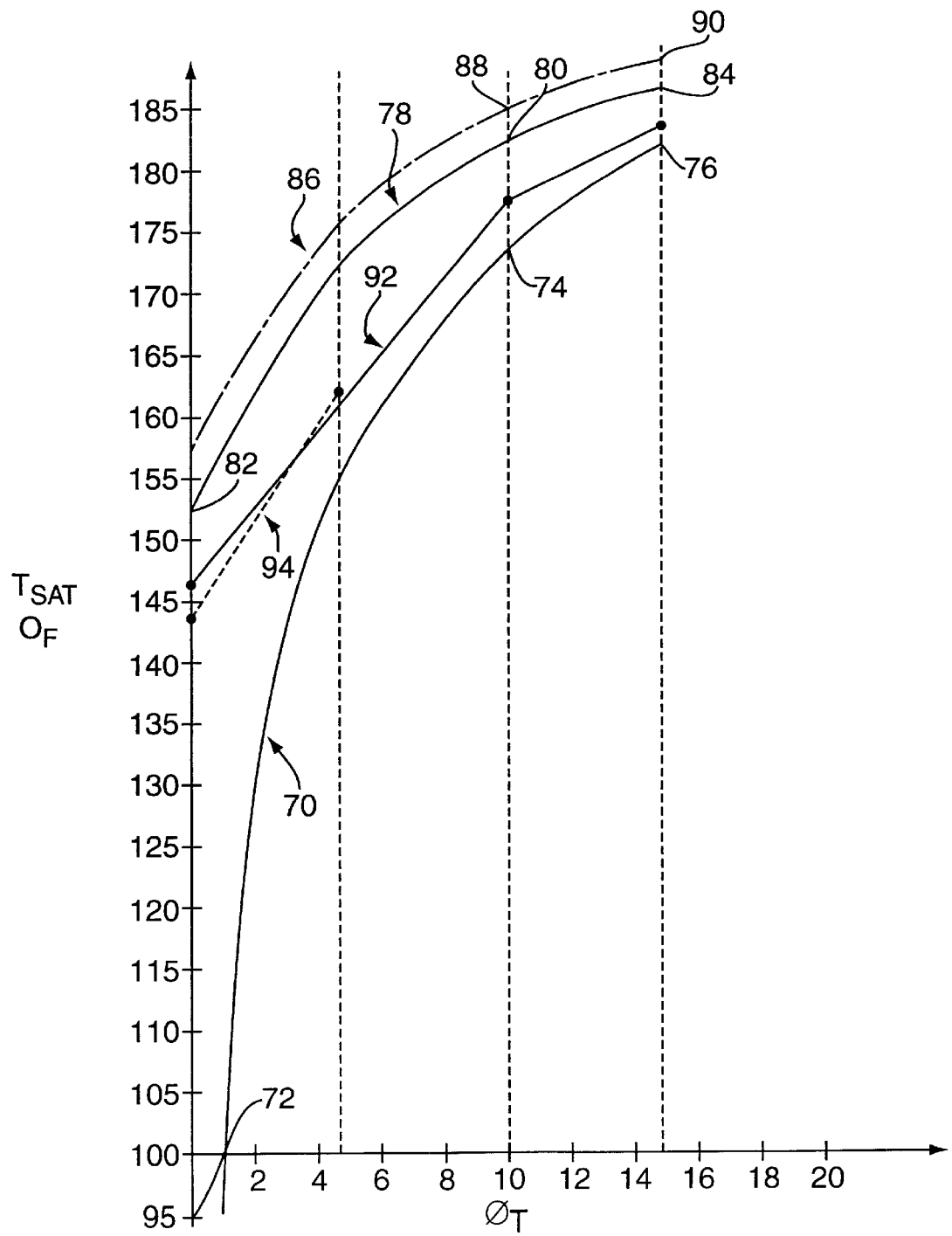
FIG. 2 graphically illustrates the amount of water transferred to air per amount of methane ($CH_4$) fed to the fuel cell as a function of temperature for various locations within the humidity exchange device.

FIG. 2, as an example, illustrates how a single stage contact condenser-saturator can achieve air humidification levels of over 170° F. dewpoint by exchanging water from the combined cathode exhaust gas stream leaving the cathode output port 22 of the fuel cell 12 and the anode exhaust combustor exhaust leaving the combustor exhaust port 41 of the heat exchanger 35 to the total fuel cell system oxidant gas stream including that entering the cathode input port 20 of the fuel cell and the input port 33 of the anode exhaust combustor 29. More specifically, FIG. 2 shows the number of moles of water transferred to the oxidant gas or air per mole of $CH_4$ fed to the fuel cell power plant ($\phi_T$) as a function of dewpoint or temperature (°F.). This relationship is illustrated for various locations within the humidity exchange device 30.

Curve 70 illustrates this relationship for a saturated, total fuel cell system oxidant or air stream along its path through the contact saturator 34 from its gas input port 48 to its gas output port 50 corresponding from point 72 to point 74 along the curve 70. The curve 70 is associated with a $\phi_C$ of about three for the water recovery condenser 58 (i.e., the number of moles of water condensed by the water recovery condenser 58 per mole of $CH_4$ fed to the fuel cell 12 is about three). In this example, it is assumed that the oxidant supply at point 72 is very dry or has a very low saturation temperature as it enters the contact saturator 34 at its gas input port 48. As is expected $\phi_T$ is zero at point 72 along the curve 70 because the oxidant as it enters the contact saturator 34 has not yet come into contact with water flowing therethrough, and therefore has not yet picked up Water flowing through the contact saturator. As the oxidant gas flows through the contact saturator 34 from the gas input port 48 to the gas output port 50 (i.e., from point 72 to point 74 along the curve 70), the oxidant gas progressively and increasingly absorbs heat from the water flowing through the contact saturator, and thus its dewpoint progressively increases when entering the contact saturator (point 72 along the curve 70) to about 170° F. when leaving the contact saturator (point 74 along the curve 70). The oxidant gas progressively and increasingly picks up water vapor as it travels through the contact saturator 34 such that $\phi_T$ increases from zero as it enters the contact saturator 34 (point 72 along the curve 70) to about ten as it leaves the contact saturator (point 74 along the curve 70).

Higher levels of humidification are achievable when staging two or more humidity exchange devices in series with one another. For example, the curve 70 at point 76 corresponds to a $\phi_T$ equal to fifteen and a dewpoint of about 180° F. for a fuel cell system which employs a two stage contact condenser/contact saturator.

Curve 78 illustrates the relationship of $\phi_T$ to dewpoint for a saturated process exhaust stream along its path through the contact condenser 32 from its gas input port 40 to its gas output port 42 condenser 58 per mole of $CH_4$ fed to the fuel cell 12 is about three). In this corresponding from point 80 to point 82 along the curve 78 where $\phi_C$ is about three. The saturated process exhaust has a temperature or dewpoint of, for example, 180° F. (point 80 along the curve 78) as it enters the contact condenser 32 at its gas input port 40. As is expected $\phi_T$ is ten at point 80 along the curve 78 because this corresponds to the amount of moisture initially carried by the process exhaust which is to be transferred to the oxidant supply gas stream flowing through the contact saturator 34. As the process exhaust gas flows through the contact condenser 32 from the gas input port 40 to the gas output port 42 (i.e., from point 80 to point 82 along the curve 78), the process exhaust gas progressively and increasingly releases heat and water vapor into the water flowing through the contact condenser, and thus its dewpoint progressively decreases from about 180° F. when entering the contact condenser (point 80 along the curve 78) to about 152° F. when leaving the contact condenser (point 82 along the curve 78). The process exhaust gas progressively and increasingly gives up water vapor as it travels through the contact condenser 32 such that $\phi_T$ decreases from ten as it enters the contact condenser 32 (point 80 along the curve 78) to about zero as it leaves the contact condenser (point 82 along the curve 78). If a two stage contact condenser/contact saturator is employed, the initial dewpoint of the process exhaust is about 185° F. and $\phi_T$ is about fifteen, as shown at point 84 along the curve 78.

Curve 86 illustrates that slightly higher levels of water transfer are achievable if $\phi_C$ is about four for the water recovery condenser 58 for either a single stage system (point 88 along the curve 86) or a two stage system (point 90 along the curve 86).

Curve 92 shows the temperature of water flowing through the water loop 52 where $\phi_T$ is about ten, and curve 94 shows the temperature of water flowing through the water loop where $\phi_T$ is about five. The water temperature within the water loop is at its lowest as the water enters the contact condenser 32 and is at its highest as it enters the contact saturator 34. As can be seen by the curves 92 and 94, the temperature of the water flowing through the water loop 54 is lower than the temperature of the process exhaust flowing through the contact condenser 32 and higher than that of the oxidant supply gas flowing through the contact saturator 34 in order to generate a driving force for transferring moisture and heat from the combined process exhaust leaving the fuel cell 12 and the anode exhaust combustor 29 to the oxidant gas entering the fuel cell via the medium of the circulating water in the water loop 52.

Figure 3:
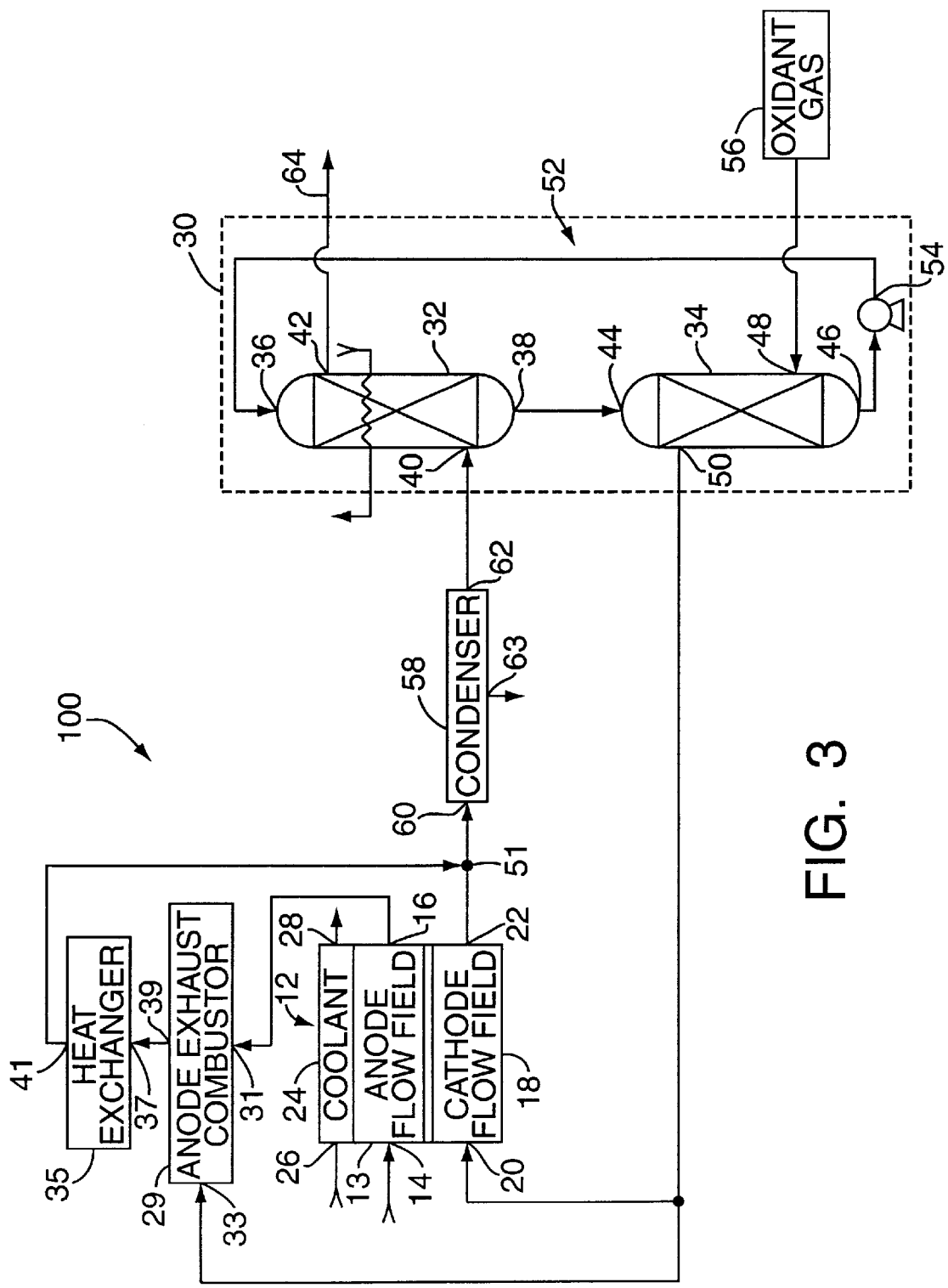
FIG. 3 schematically illustrates a water recovery fuel cell system including a humidity exchange device disposed downstream from a water recovery condenser in accordance with a second embodiment of the present invention.

With reference to FIG. 3, a water recovery fuel cell system in accordance with a second embodiment of the present invention is generally designated by the reference number 100. Like elements with the system 10 of FIG. 1 are labeled with like reference numbers. The system 100 of FIG. 3 is similar to the system 10 of FIG. 1 except that the water recovery condenser 58 in FIG. 3 is disposed upstream of the humidity exchange device 30.

The fuel cell system 100 is ideally suited for maintaining water self-sufficiency in hot, arid climates or in economically poor localities where the generation and conservation of water is highly valued. The present invention is also suitable in military applications which require water generation at remote locations. As shown in FIG. 3, the gas input port 60 of the water recovery condenser 58 is coupled to the combined cathode output port 22 of the fuel cell 12 and the combustor exhaust port 41 of the heat exchanger 35 via the junction 51, and the gas output port 62 of the water recovery condenser is coupled to the gas input port 40 of the contact condenser 32. The gas output port 42 of the contact condenser 32 is coupled to the exhaust conduit 64.

Figure 4:
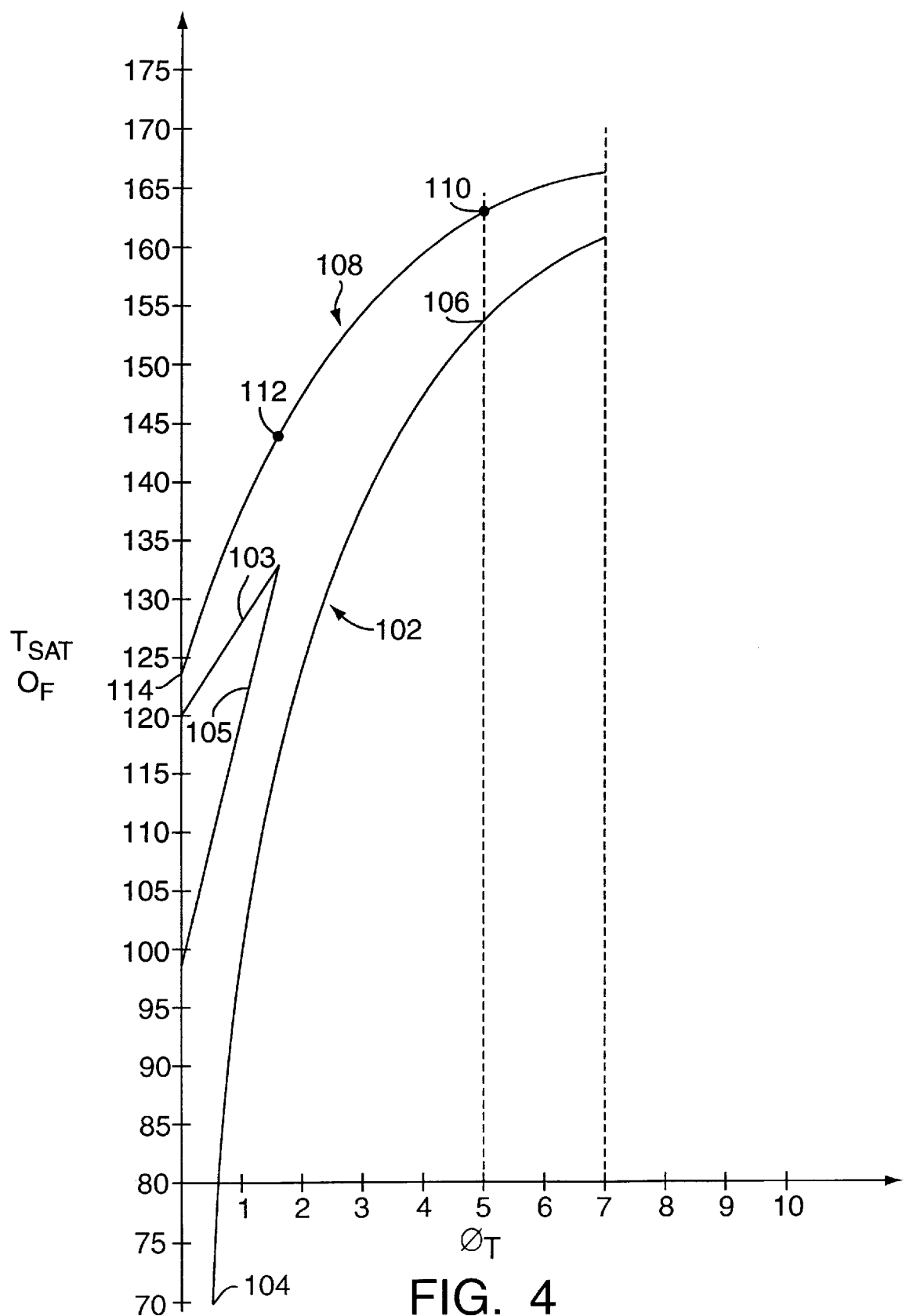
FIG. 4 graphically illustrates the amount of water transferred to air per amount of $CH_4$ fed to the fuel cell system of FIG. 3 as a function of temperature for various locations within the humidity exchange device.

Providing the humidity exchange device 30 downstream of the water recovery condenser 58 has permitted the fuel cell system 100 to maintain water self-sufficiency in environments having dry, ambient air having a temperature as high as 117° F. FIG. 4 graphically illustrates the number of moles of water transferred to the oxidant gas or air per mole of $CH_4$ fed to the fuel cell power plant ($\phi_T$) as a function of dewpoint or temperature (°F.). This relationship is illustrated for various locations within the humidity exchange device 30.

Curve 102 illustrates this relationship for a dry, ambient air stream along its path through the contact saturator 34 from its gas input port 48 to its gas output port 50 corresponding from about point 104 to point 106 along the curve 102. In this example, the dry, ambient air has a predetermined supply temperature of, for example, 117° F. immediately before the air enters the contact saturator 34. The air temperature initially drops to a wet bulb temperature of about 70° F. (point 104 along the curve 102) as it enters the contact saturator 34 at its gas input port 48. As the oxidant flows through the contact saturator 34 from its gas input port 48 to its gas output port 50 (i.e., from about point 104 to point 106 along the curve 102), the oxidant gas progressively and increasingly absorbs heat from the water flowing through the contact saturator, and thus its dewpoint progressively increases to about 160° F. when leaving the contact saturator (point 106 along the curve 102). The oxidant gas also progressively and increasingly picks up water vapor as it travels through the contact saturator 34 such that $\phi_T$ increases from about zero as it enters the contact saturator 34 (point 104 along the curve 102) to about seven as it leaves the contact saturator (point 106 along the curve 102).

Curve 108 illustrates the relationship of $\phi_T$ to dewpoint for process exhaust along its path through the water recovery condenser 58 and through the contact condenser 32 from its gas input port 40 to its gas output port 42. The saturated process exhaust at the gas input port 60 of the water recovery condenser 58 has a saturation temperature of, for example, 163° F. (point 110 along the curve 108) and gives off heat to the water recovery condenser such that the process exhaust is about 145° F. upon leaving the water recovery condenser at its output port 62. The process exhaust flowing through the contact condenser 32 further releases thermal energy and water to the water circulating through the contact condenser 32 so as to drop from a temperature of 145° F. at the gas input port 40 of the contact condenser (point 112 along the curve 108) to a temperature of 123° F. at the gas output port 42 of the contact condenser (point 114 along the curve 108). Curves 103 and 105 illustrate the range of water loop temperatures that may be employed.

The above example illustrates the maximum ambient air temperature (i.e., 117° F.) for maintaining water self-sufficiency, and consequently at such extreme temperatures no excess water is collected by the water recovery condenser 58. However, at lower ambient air temperatures, the fuel cell system 100 generates substantial product water that is collected in the water recovery condenser 58. For example, where the ambient air temperature is about 95° F., approximately one mole of excess water is generated per mole of methane fed to the fuel cell system 100. However, without the humidity exchange device 30, water self-sufficiency is limited to ambient air supply temperatures as high as about 95° F.

Figure 5:
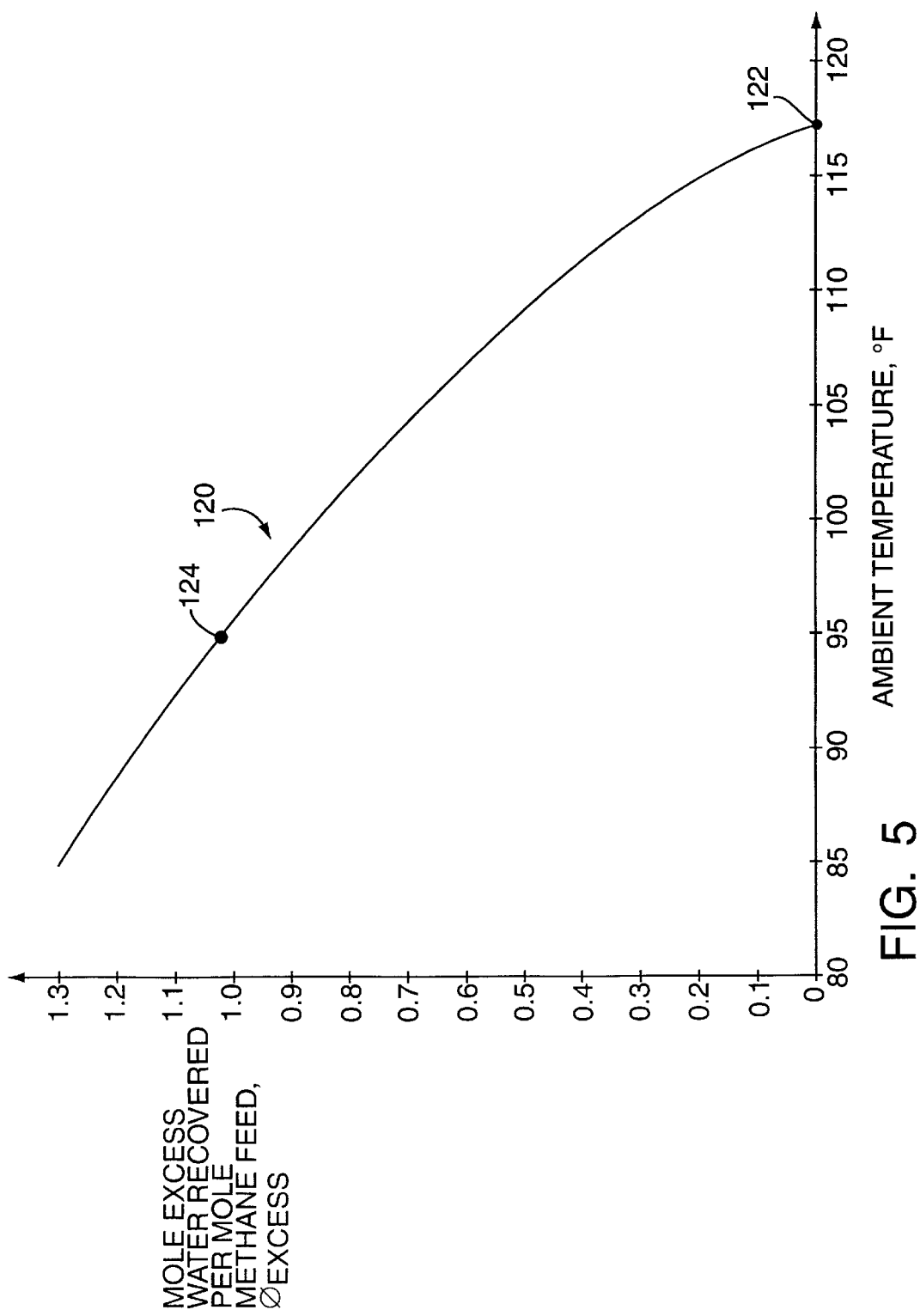
FIG. 5 graphically illustrates the amount of excess water recovered per amount of $CH_4$ fed to the fuel cell system of FIG. 3 as a function of ambient temperature.

FIG. 5 graphically illustrates by means of curve 120 the number of moles of excess water recovered per mole methane feed as a function of ambient temperature. As is expected, about zero moles of excess water is collected at the water recovery condenser 58 where the system 100 is operating at an ambient temperature of about 117° F. (point 122 along the curve 120). As is also expected, when the fuel cell system 100 is operating at an ambient temperature of about 95° F., approximately one mole of excess water is collected by the water recovery condenser 58 per mole of methane fed to the fuel cell 12 (point 124 along the curve 120).

Although this invention has been shown and described with respect to an exemplary embodiment thereof, it should be understood by those skilled in the art that the foregoing and various other changes, omissions, and additions in the form and detail thereof may be made therein without departing from the spirit and scope of the invention. For example, the use of humidity exchange devices and condensers as described herein could be used to exchange water between the fuel cell power plant process exhaust gas and only the cathode oxidant input port gas stream. Accordingly, the present invention has been shown and described in various embodiments by way of illustration rather than limitation.

What is claimed is:

1. A water recovery fuel cell system, comprising:
   a fuel cell defining a cathode flow field including a cathode input port and a cathode output port, and an anode flow field including an anode input port and an anode output port;
   combustor means having an input port communicating with the anode output port and to be coupled to an oxidant supply, and having an output communicating with the cathode output port at a junction for providing a combustor exhaust combined at the junction with cathode exhaust leaving the cathode output port to form a process exhaust gas;
   a humidity exchange device defining a supply gas input port, a supply gas output port, a process exhaust gas input port and a process exhaust gas output port, the supply gas input port to be coupled to a source of oxidant gas, the supply gas output port being coupled to the cathode input port of the fuel cell and the input port of the combustor means, the process exhaust gas input port communicating with the junction, and the exhaust gas output port communicating with a power plant exhaust conduit, a power plant exhaust path being defined from the cathode output port of the fuel cell to the power plant exhaust conduit via the humidity exchange device; and
   a water recovery condenser disposed along the power plant exhaust path between the junction and the power plant exhaust conduit.

2. A fuel cell system as defined in claim 1, wherein the water recovery condenser is interposed between the junction and the exhaust gas input port of the humidity exchange device.

3. A fuel cell system as defined in claim 1, wherein the water recovery condenser is interposed between the exhaust gas output port of the humidity exchange device and the power plant exhaust conduit.

4. A fuel cell system as defined in claim 1, wherein the humidity exchange device includes a contact condenser and a contact saturator, the contact condenser including the process exhaust gas input port and the process exhaust gas output port, and the contact saturator including the supply gas input port and the supply gas output port.

5. A fuel cell system as defined in claim 4, wherein the contact condenser includes a water input port and a water output port, and the contact saturator includes a water input port and a water output port, the water output port of the contact condenser being coupled to the water input port of the contact saturator, and the water output port of the contact saturator being coupled to the water input port of the contact condenser to thereby form a closed water loop for circulating water through the contact condenser and the contact saturator, and further including means for circulating water through the contact condenser and the contact saturator.

6. A fuel cell system as defined in claim 5, wherein the circulating means is a water pump disposed along the water loop.

7. A fuel cell system as defined in claim 1, further including a blower coupled to the supply gas input port of the humidity exchange device for driving an oxidant gas through the humidity exchange device and into the cathode flow field of the fuel cell and the input port of the combustor means.

8. A fuel cell system as defined in claim 1, further including a compressed oxidant source coupled to the supply gas input port of the humidity exchange device for driving an oxidant gas through the humidity exchange device and into the cathode flow field of the fuel cell and the input port of the combustor means.

9. A water recovery fuel cell system, comprising:
   a fuel cell defining a cathode flow field including a cathode input port and a cathode output port, and an anode flow field including an anode input port and an anode output port;
   combustor means having an input port communicating with the anode output port and to be coupled an oxidant supply, and having an output communicating with the cathode output port at a junction for providing a combustor exhaust combined at the junction with cathode exhaust leaving the cathode output port to form a process exhaust gas;
   a contact condenser defining a water input port, a water output port, a gas input port and a gas output port, the gas input port of the contact condenser communicating with the junction, and the gas output port of the contact condenser communicating with a power plant exhaust conduit to thereby form an exhaust path from the cathode output port to the power plant exhaust conduit via the contact condenser;

a contact saturator defining a water input port, a water output port, a gas input port and gas output port, the gas input port of the contact saturator for receiving an oxidant gas flow, the gas output port of the contact saturator being coupled to the cathode input port of the fuel cell and to the input port of the combustor means, the water output port of the contact condenser being coupled to the water input port of the contact saturator, and the water output port of the contact saturator being coupled to the water input port of the contact condenser to thereby form a closed-loop for circulating water through the contact condenser and the contact saturator;

means for circulating water through the contact condenser and the contact saturator; and a water recovery condenser disposed along the power plant exhaust path between the junction and the power plant exhaust conduit.

10. A fuel cell system as defined in claim 9, wherein the water recovery condenser is interposed between the junction and the gas input port of the contact condenser.

11. A fuel cell system as defined in claim 9, wherein the water recovery condenser is interposed between the gas output port of the contact condenser and the power plant exhaust conduit.

12. A fuel cell system as defined in claim 9, wherein the circulating means is a water pump.

13. A fuel cell system as defined in claim 9, further including a blower coupled to the gas input port of the contact saturator for driving an oxidant gas through the contact saturator and into the cathode flow field of the fuel cell and the input port of the combustor means.

14. A fuel cell system as defined in claim 9, further including a compressed oxidant source coupled to the gas input port of the contact saturator for driving an oxidant gas through the contact saturator and into the cathode flow field of the fuel cell and the input port of the combustor means.

15. A water recovery fuel cell system, comprising:

a fuel cell defining a cathode flow field including a cathode input port and a cathode output port, and an anode flow field including an anode input port and an anode output port;

combustor means having an input port communicating with the anode output port and to be coupled to an oxidant supply, and having an output communicating with the cathode output port at a junction for providing a combustor exhaust combined at the junction with cathode exhaust leaving the cathode output port to form a process exhaust gas;

a water recovery condenser including a gas input port and a gas output port, the gas output port coupled to a power plant exhaust conduit;

a contact condenser defining a water input port, a water output port, a gas input port and a gas output port, the gas input port of the contact condenser being coupled to the junction, and the gas output port of the contact condenser being coupled to the gas input port of the water recovery condenser;

a contact saturator defining a water input port, a water output port, a gas input port and gas output port, the gas input port of the contact saturator for receiving an oxidant gas flow, the gas output port of the contact saturator being coupled to the cathode input port of the fuel cell and to the input port of the combustor means, the water output port of the contact condenser being coupled to the water input port of the contact saturator, and the water output port of the contact saturator being coupled to the water input port of the contact condenser to thereby form a closed-loop for circulating water through the contact condenser and the contact saturator; and means for circulating water through the contact condenser and the contact saturator.

16. A fuel cell system as defined in claim 15, wherein the circulating means is a water pump.

17. A fuel cell system as defined in claim 15, further including a blower coupled to the gas input port of the contact saturator for driving an oxidant gas through the contact saturator and into the cathode flow field of the fuel cell and the input port of the combustor means.

18. A fuel cell system as defined in claim 15, further including a compressed oxidant source coupled to the gas input port of the contact saturator for driving an oxidant gas through the contact saturator and into the cathode flow field of the fuel cell and the input port of the combustor means.

19. A water recovery fuel cell system, comprising:

a fuel cell defining a cathode flow field including a cathode input port and a cathode output port, and an anode flow field including an anode input port and an anode output port;

combustor means having an input port communicating with the anode output port and to be coupled to an oxidant supply, and having an output communicating with the cathode output port at a junction for providing a combustor exhaust combined at the junction with cathode exhaust leaving the cathode output port to form a process exhaust gas;

a water recovery condenser including a gas input port and a gas output port, the gas input port being coupled to the junction;

a contact condenser defining a water input port, a water output port, a gas input port and a gas output port, the gas input port of the contact condenser coupled to the gas output port of the water recovery condenser, and the gas output port of the contact condenser communicating with a power plant exhaust conduit;

a contact saturator defining a water input port, a water output port, a gas input port and gas output port, the gas input port of the contact saturator for receiving an oxidant gas flow, the gas output port of the contact saturator being coupled to the cathode input port of the fuel cell and to the input port of the combustor means, the water output port of the contact condenser being coupled to the water input port of the contact saturator, and the water output port of the contact saturator being coupled to the water input port of the contact condenser to thereby form a closed-loop for circulating water through the contact condenser and the contact saturator; and means for circulating water through the contact condenser and the contact saturator.

20. A fuel cell system as defined in claim 19, wherein the circulating means is a water pump.

21. A fuel cell system as defined in claim 19, further including a blower coupled to the gas input port of the contact saturator for driving an oxidant gas through the contact saturator and into the cathode flow field of the fuel cell and the input port of the combustor means.

22. A fuel cell system as defined in claim 19, further including a compressed oxidant source coupled to the gas input port of the contact saturator for driving an oxidant gas through the contact saturator and into the cathode flow field of the fuel cell and the input port of the combustor means.

* * * * *